(12) United States Patent
Kodaka et al.

(10) Patent No.: US 9,133,604 B2
(45) Date of Patent: Sep. 15, 2015

(54) HYDRAULIC CONTROL DEVICE FOR WORK MACHINE

(71) Applicant: Hitachi Construction Machinery Co., Ltd., Bunkyo-ku, Tokyo (JP)

(72) Inventors: Katsuaki Kodaka, Tsuchiura (JP); Tsuyoshi Takayama, Tsuchiura (JP); Yukihiro Tatsuno, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/373,507

(22) PCT Filed: Jan. 18, 2013

(86) PCT No.: PCT/JP2013/050975
§ 371 (c)(1),
(2) Date: Jul. 21, 2014

(87) PCT Pub. No.: WO2013/108889
PCT Pub. Date: Jul. 25, 2013

(65) Prior Publication Data
US 2014/0367187 A1    Dec. 18, 2014

(30) Foreign Application Priority Data

Jan. 19, 2012 (JP) ................................. 2012-009249

(51) Int. Cl.
*E02F 3/85* (2006.01)
*E02F 9/20* (2006.01)
(Continued)

(52) U.S. Cl.
CPC ............... *E02F 9/2025* (2013.01); *B60T 1/062* (2013.01); *B60T 7/085* (2013.01); *B60T 7/12* (2013.01);
(Continued)

(58) Field of Classification Search
USPC .................................. 180/338; 172/799.5, 812
See application file for complete search history.

(56) References Cited

U.S. PATENT DOCUMENTS 2,661,081 A * 12/1953 Hager et al. .................. 188/353
4,495,767 A * 1/1985 Akiyama et al. ................ 60/436
(Continued)

FOREIGN PATENT DOCUMENTS

JP    2006-7849 A    1/2006
JP    2006-306350 A    11/2006
(Continued)

OTHER PUBLICATIONS

International Search Report dated Feb. 26, 2013 with English translation (five (5) pages).

*Primary Examiner* — Paul N Dickson
*Assistant Examiner* — Darlene P Condra
(74) *Attorney, Agent, or Firm* — Crowell & Moring LLP (57) ABSTRACT

A hydraulic control device for work machine includes: a driving device that generates a driving force for traveling of the work machine; a park braking device that parks the work machine; an operating unit that is provided in a cab of the work machine and operated by an operator for driving a work device; a hydraulic brake device that generates a braking force according to operation of a brake pedal; a hydraulic lock unit that hydraulically locks the hydraulic brake device to cause the hydraulic brake device to be continuously operated; a work device drivable state judging unit that judges whether or not the work device is in a work device drivable state in which the work device can be driven; and a park brake control unit that brings the park braking device into operation when the hydraulic lock unit hydraulically locks the hydraulic brake device and the work device drivable state judging unit judges that the work device drivable state has not been established.

6 Claims, 6 Drawing Sheets

(51) Int. Cl.
    *B60T 13/66* (2006.01)
    *B60T 13/68* (2006.01)
    *E02F 9/22* (2006.01)
    *B60T 7/08* (2006.01)
    *B60T 17/22* (2006.01)
    *B60T 1/06* (2006.01)
    *B60T 7/12* (2006.01)

(52) U.S. Cl.
    CPC ............... *B60T 13/66* (2013.01); *B60T 13/662* (2013.01); *B60T 13/686* (2013.01); *B60T 17/22* (2013.01); *E02F 9/226* (2013.01); *E02F 9/2253* (2013.01); *E02F 9/2292* (2013.01)

(56) References Cited

U.S. PATENT DOCUMENTS

| | | | |
|---|---|---|---|
| 4,938,085 A * | 7/1990 | Suzuki et al. | 74/15.2 |
| 6,026,869 A * | 2/2000 | Holmes | 144/4.1 |
| 6,267,163 B1 * | 7/2001 | Holmes | 144/336 |
| 8,494,733 B2 | 7/2013 | Kodaka et al. | |
| 2006/0279136 A1 * | 12/2006 | Haeussler et al. | 303/20 |
| 2008/0303342 A1 | 12/2008 | Kodaka et al. | |
| 2010/0016123 A1 | 1/2010 | Kodaka et al. | |
| 2010/0052416 A1 * | 3/2010 | Aiba et al. | 303/35 |
| 2010/0206382 A1 * | 8/2010 | Takahashi et al. | 136/263 |
| 2011/0036674 A1 | 2/2011 | Kodaka et al. | |
| 2011/0060494 A1 * | 3/2011 | Tsujii et al. | 701/29 |
| 2011/0300992 A1 * | 12/2011 | Richter et al. | 477/186 |
| 2014/0347483 A1 * | 11/2014 | Nakanishi et al. | 348/148 |

FOREIGN PATENT DOCUMENTS

| | | |
|---|---|---|
| JP | 2007-51652 A | 3/2007 |
| JP | 2007-71135 A | 3/2007 |
| JP | 2008-149802 A | 7/2008 |
| JP | 2008-215084 A | 9/2008 |
| JP | 4229131 B2 | 2/2009 |

* cited by examiner

HYDRAULIC CONTROL DEVICE FOR WORK MACHINE

TECHNICAL FIELD

The present invention relates to a hydraulic control device for a work machine for controlling a park braking device.

BACKGROUND ART

A work machine such as a wheeled hydraulic excavator or a wheel loader includes a work braking device that is operated upon working and a park braking device that is operated upon parking. The work braking device and the park braking device are operated or released according to the changeover position of a brake switch that changes over the operating state of the brake.

CITATION LIST

Patent Literature

Patent Document 1: Japanese Laid Open Patent Publication No. 2006-007849

SUMMARY OF INVENTION

Technical Problem

In case of the work vehicle described in the Patent Document mentioned above, when a brake switch is changed over to a parking position, the work braking device is released and the park braking device is brought into operation. On the other hand, when the brake switch is changed over to a working position, the work braking device is brought into operation and the park braking device is released. When a changeover switch other than the brake switch is changed over to an automatic position, the work braking device is automatically brought into operation or released under predetermined conditions. When a work is performed with the work vehicle described in the Patent Document mentioned above, the work braking device is brought into operation by changing over the brake switch to the working position or by changing over the changeover switch to the automatic position.

In this manner, the movement of the work vehicle due to the load of work upon working is prevented by means of the work braking device. However, if the park braking device is brought into operation upon working, there is the possibility that excessive load will be imposed on the park braking device. Accordingly, while the work braking device is in operation, the park braking device is released. When the operator leaves the vehicle for checkup or the like, the park braking device must be brought into operation. However, when the operator gets out of the vehicle, by any chance, in a state in which the park braking device is not brought into operation but the work braking device is brought into operation, then if the work braking device is released for one reason or another, there is the possibility that on an irregular ground or the like, the work vehicle could start moving since the park braking device is released.

Solution to Problem

A hydraulic control device for work machine according to a first aspect of the present invention comprises: a driving device that generates a driving force for traveling of the work machine; a park braking device that parks the work machine; an operating unit that is provided in a cab of the work machine and operated by an operator for driving a work device; a hydraulic brake device that generates a braking force according to operation of a brake pedal; a hydraulic lock unit that hydraulically locks the hydraulic brake device to cause the hydraulic brake device to be continuously operated; a work device drivable state judging unit that judges whether or not the work device is in a work device drivable state in which the work device can be driven; and a park brake control unit that brings the park braking device into operation when the hydraulic lock unit hydraulically locks the hydraulic brake device and the work device drivable state judging unit judges that the work device drivable state has not been established.

According to a second aspect of the present invention, in the hydraulic control device for work machine according to the first aspect, it is preferable to further comprise: a gate lock unit that changes over whether or not the work device can be operated by the operating unit; and a gate lock changeover state detection unit that detects a changeover state of the gate lock unit, wherein: the work device drivable state judging unit judges that the work device drivable state has not been established when the gate lock changeover state detection unit detects that the gate lock unit prohibits operation of the work device by the operating unit.

According to a third aspect of the present invention, the hydraulic control device for work machine according to the first aspect may further comprise: an operation detection unit that detects whether or not the operating unit is operated, wherein: the work device drivable state judging unit judges that the work device drivable state is not established when the operation detection unit detects that the operating unit has not been operated.

According to a fourth aspect of the present invention, the hydraulic control device for work machine according to the first aspect may further comprise: a seating detection unit that detects whether or not the operator is seated in an operator's seat of the work machine, wherein: the work device drivable state judging unit judges that the work device drivable state is not established when the seating detection unit detects that the operator is not seated in the operator's seat.

According to a fifth aspect of the present invention, in the hydraulic control device for work machine according to any one of the first to fourth aspects, it is preferable that the park braking device comprises a transmission that has first and second clutch devices of negative type; and the transmission prevents rotation of an axle shaft when the first and second clutch devices are engaged simultaneously, sets a first transmission gear ratio to allow rotation of the axle shaft when the first clutch device is released, and sets a second transmission gear ratio, which is greater than the first transmission gear ratio, to allow the rotation of the axle shaft when the second clutch device is released.

Advantageous Effect of the Invention

According to the present invention, even if the operator should forget actuation of the park braking device, unintended movement of the work machine can be prevented to secure increased safety.

DESCRIPTION OF EMBODIMENTS

Figure 1:
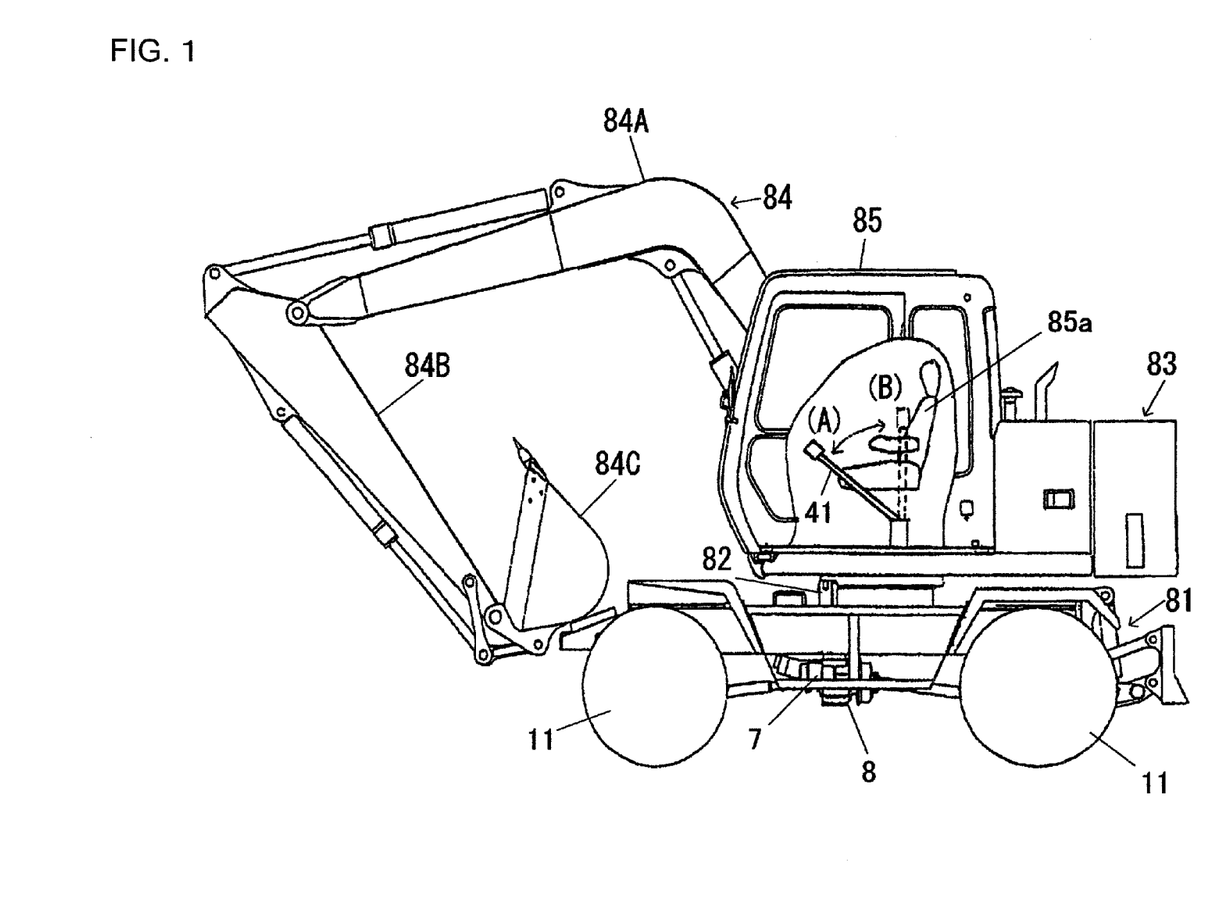
FIG. 1 presents a side elevation (partial cross-section) showing a wheeled hydraulic excavator (wheel excavator) as an example of a work machine according to an embodiment of the present invention.

Referring to FIGS. 1-4, an embodiment of the hydraulic control device according to the present invention is explained. FIG. 1 presents a side elevation (partial cross-section) showing a wheeled hydraulic excavator (wheel excavator) as an example of a work machine according to an embodiment of the present invention. The wheel excavator shown in FIG. 1 includes a lower traveling body 81 and an upper swiveling body 83, which is swivelably connected to an upper part of the lower traveling body 81 via a swiveling device 82. The upper swiveling body 83 is provided with a work front attachment 84, which consists of a boom 84A, an arm 84B and a bucket 84C, and an operator's cab 85. Inside the operator's cab 85 is provided an operator's seat 85a. At the entrance of the operator's cab 85, there is provided a gate lock lever 41 that can be operated between a release position (position A), which protrudes toward a boarding path and a lock position (position B), which is retracted from the boarding path. The lower traveling body 81 is provided with a hydraulic motor (traveling motor) 7 for traveling. The traveling motor 7 drives tires 11 to rotate as explained later.

Figure 2:
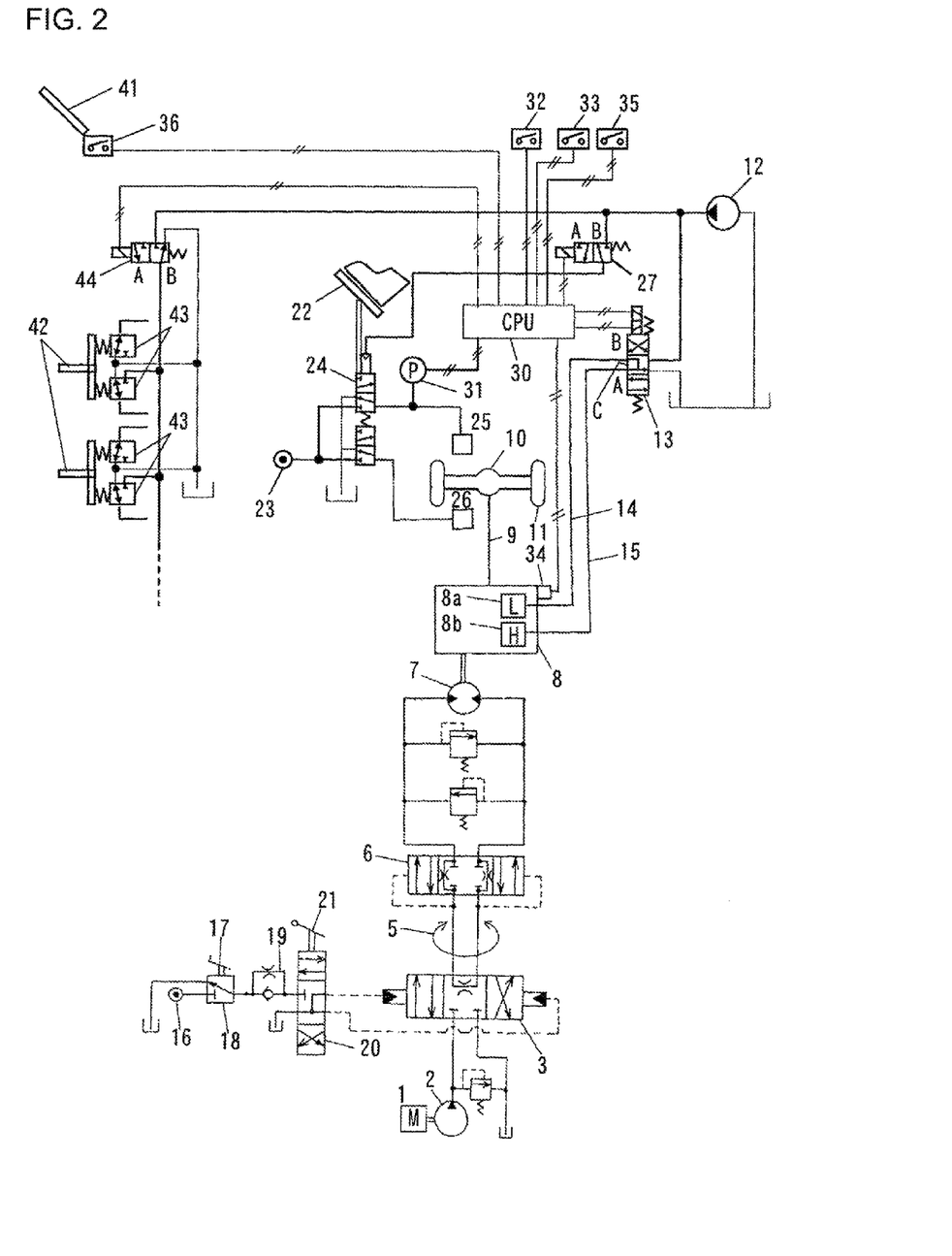
FIG. 2 presents a diagram showing a configuration of a hydraulic control device for a work machine according to the present embodiment.

FIG. 2 presents a diagram showing the configuration of a hydraulic control device for a work machine according to the present embodiment. An engine (prime mover) 1 drives a main pump 2 to discharge oil. The discharged oil from the main pump 2 flows through a control valve 3, through which direction and flow rate of the discharged oil is controlled. The discharged oil further flows through a center joint 5 and a counter balance valve 6 and is supplied to a traveling motor 7. The rotation of the traveling motor 7 is changed by a transmission 8 and transmitted through an axle shaft 9 and axle 10 to the tires 11 and the wheel excavator travels.

The transmission 8 is a conventional one that has a planetary gear reduction mechanism that includes a sun gear, a planetary gear and a ring gear and clutches 8a and 8b provided at the sun gear side and the ring gear side thereof, respectively. That is, though not shown, the clutches 8a and 8b have respective clutch cylinders having incorporated therein springs, respectively. The clutch cylinders are pressed onto discs due to biasing force of the springs, and this brings the clutches 8a and 8b into an engaged state. On the other hand, the pressing force of the clutch cylinders is canceled by hydraulic force from a hydraulic pressure source 12 that is applied against the spring force so as to bring the clutches 8a and 8b into a released state. The hydraulic force applied to the clutches 8a and 8b is controlled by driving an electromagnetic changeover valve 13. Note that a clutch that is brought into an engaged state by the biasing force of a spring and into a released state by the hydraulic force is called a negative type clutch.

The electromagnetic changeover valve 13 is changed over according to a control signal from a CPU 30. When the electromagnetic changeover valve 13 is changed over to a position A, the hydraulic oil from the hydraulic pressure source 12 is allowed to act on the clutch 8a through a conduit 14. This causes the clutch 8a to be released and the clutch 8b to be brought into an engaged state, and the transmission 8 is set at a predetermined transmission gear ratio R1 (low gear), so that first gear traveling which is performed at low speed with high torque becomes possible. When the electromagnetic valve 13 is changed over to a position B, the hydraulic oil from the hydraulic pressure source 12 is allowed to act on the clutch 8b through a conduit 15. As a result, the clutch 8b is released and the clutch 8a is brought into an engaged state; and the transmission 8 is set at a predetermined transmission gear ratio R2 (high gear), so that second gear traveling which is performed at high speed with low torque become possible. Note that the transmission gear ratio R1 is greater than the transmission gear ratio R2.

On the other hand, when the electromagnetic valve 13 is changed over to a position C, the conduits 14 and 15 are communicated to a hydraulic oil tank. In this case, the clutches 8a and 8b are brought into an engaged state by the spring force, so that the transmission 8 is locked and the rotation of the axle shaft 9 is prevented. In the present embodiment, the clutches 8a and 8b that prevent the rotation of the axle shaft 9 are used as a park braking device. To release the park braking device, hydraulic oil (brake release pressure) is acted on one of the clutch 8a or 8b to bring the clutch 8a or 8b into a released state. Note that a braking device which is brought into operation by the biasing force of the spring and released by hydraulic force is called a negative type park braking device.

A traveling pilot circuit includes a pilot hydraulic pressure source 16 that generates pressure oil when it is driven by the engine 1 and a traveling pilot valve 18 that generates a pilot secondary pressure according to depression of an accelerator pedal 17. The traveling pilot circuit includes a slow return valve 19, which is provided between the pilot valve 18 and a forward/backward changeover valve 20 explained later and retards return of oil to the pilot valve 18, and the forward/backward changeover valve 20, which selects forward movement, backward movement or neutral of the wheel excavator. The forward/backward changeover valve 20 is changed over by the operation of an operating lever 21. The pilot pressure from the pilot hydraulic pressure source 16 acts on a pilot port of the control valve 3 and drives the control valve 3. By adjusting the amount of valve stroke with the accelerator pedal 17, the travel speed of the wheel excavator can be adjusted.

The wheel excavator is provided with a conventional hydraulic foot brake device (service braking device) that exerts deceleration force according to the operation of a brake pedal 22. The pilot circuit for the foot brake includes a pilot hydraulic pressure source 23 that is driven by the engine 1 to generate pressure oil and a brake valve 24 that generates a pilot secondary pressure (brake operation pressure) according to a depression amount of the brake pedal 22. By operating the brake pedal 22, the brake operation pressure from the brake valve 24 acts on each of a front wheel braking device 25 and a rear wheel braking device 26. As a result, the braking devices 25 and 26 are operated according to the operation of the brake pedal 22 and the braking devices 25 and 26 can be used as a service braking device upon traveling.

To the brake valve 24 is connected the hydraulic pressure source 12 via an electromagnetic valve 27. The electromagnetic valve 27 is changed over according to a signal from the CPU 30. When the electromagnetic valve 27 is changed over to a position A, the pilot pressure from the hydraulic pressure source 12 is allowed to act on the brake valve 24. As a result, the brake valve 24 is driven and the hydraulic oil from the hydraulic pressure source 23 acts on the braking devices 25 and 26. Therefore, the braking devices 25 and 26 can be operated without operating the brake pedal 22, so that the braking devices 25 and 26 can be used as a work braking device upon working. That is, in the wheel excavator according to the present embodiment, by hydraulically locking the braking devices 25 and 26 by means of the pressure oil from the hydraulic pressure source 23 so as to allow the braking devices 25 and 26 to act continuously, the braking devices 25 and 26 can be used as the work braking device.

On the other hand, when the electromagnetic valve 27 is changed over to a position B, the pilot pressure applied from the hydraulic pressure source 12 to the brake valve 24 is stopped. In this state, the work braking device is released, so that the braking devices 25 and 26 can be brought into operation according to operation of the brake pedal 22. The electromagnetic valve 27 is changed over, for example, according to a work brake switch 35 explained later; when the work brake switch 35 is turned on, the electromagnetic valve 27 is changed over to the position A and when the work brake switch 35 is turned off, the electromagnetic valve 27 is changed over to the position B.

A pilot circuit for operating the swiveling device 82 and each part of the work front attachment 84 includes a plurality of operating levers 42, a plurality of pilot valves 43 corresponding to the respective operating levers, and a gate lock changeover valve 44. The operating levers 42 are operating levers for operating hydraulic actuators (not shown) that drive the swiveling device 82 and respective parts of the work front attachment 84. The operating levers 42 are provided so as to correspond to the hydraulic actuators, respectively.

The pilot valves 43 are valves that are provided so as to correspond to the operating levers 42, respectively, and each pilot valve controls the pressure of the pilot hydraulic oil from the hydraulic pressure source 12 that is supplied to a control valve (not shown) according to the operating direction and operating amount of the operating lever 42. Note that the control valve (not shown) mentioned above is a valve that controls the flow of the hydraulic oil that is supplied from the main pump 2 to the hydraulic actuator (not shown) that drives the swiveling device 82 or each part of the work front attachment 84 according to the pressure of the pilot hydraulic oil that is controlled by the pilot valve 43.

The gate lock changeover valve 44 is an electromagnetic changeover valve inserted between the hydraulic pressure source 12 and the pilot valve 43 and is changed over to a position A or a position B according to a control signal from the CPU 30. When the gate lock changeover valve 44 is changed over to the position A, the pilot hydraulic oil from the hydraulic pressure source 12 is supplied to the pilot valve 43. As a result, by operating the operating lever 42, the swiveling device 82 or each part of the work front attachment 84 can be driven. When the gate lock changeover valve 44 is changed over to the position B, supply of the pilot hydraulic oil from the hydraulic pressure source 12 to the pilot valve 43 is blocked. As a result, even when the operating lever 42 is operated, the swiveling device 82 and each part of the front attachment 84 cannot be driven.

The electromagnetic changeover valve 13, the electromagnetic valve 27, and the gate lock changeover valve 44 are controlled by the CPU 30. To the CPU 30 are connected a pressure sensor 31, a park brake switch 32, a gear shift switch 33, a vehicle speed sensor 34, the work brake switch 35, and a gate lock switch 36. The pressure sensor 31 is a pressure sensor that detects brake operating pressure from the brake valve 24, that is, an operating state of the brake pedal 22. The park brake switch 32 is an operating switch that is operated by an operator in order to command operation/release of the park braking device. The park brake switch 32 outputs, when it is turned on, a signal commanding operation of the park braking device (park brake operation signal) to the CPU 30, and outputs, when it is turned off, a signal commanding release of the park braking device (park brake release signal) to the CPU 30.

The gear shift switch 33 is an operating switch that is operated by the operator in order to change the transmission 8 to first gear (first speed) or second gear (second speed). The vehicle speed sensor 34 is a sensor that detects vehicle speed. The work brake switch 35 is an operating switch that is operated by the operator in order to command operation/release of the work braking device. The work brake switch 35, when it is turned on, outputs a signal commanding operation of the work braking device (work brake operation signal) to the CPU 30 and when it is turned off, outputs a signal commanding release of the work braking device (work brake release signal) to the CPU 30. The gate lock switch 36 is a switch that detects whether the gate lock lever 41 is at a release position (position A in FIG. 1) or at a lock position (position B in FIG. 1). The gate lock switch 36, when it is at the release position, outputs a release signal to the CPU 30 and when it is at the lock position, outputs a lock signal to the CPU 30.

Note that the park brake switch 32 and the work brake switch 35 are configured so that they are not turned on simultaneously. That is, according to this configuration, when the park brake switch 32 is turned on, the work brake switch 35 is turned off. On the other hand, when the work brake switch 35 is turned on, the park brake switch 32 is turned off. Specifically, for example, a configuration may be adopted in which with a single dial, alternative selection can be made between a selection position at which only the park braking device is activated and a selection position at which only the work braking device is activated. Also, for example, a configuration may be adopted in which push button switches are used each of which is turned on when it is pushed down and fixed to a pushed down position and which is turned off when it is again pushed down to return from the pushed down position, and when one of the push button switches is pushed down and fixed to the pushed down position, the other is returned from the pushed down position.

Therefore, it never happens that the park brake operation signal and the work brake operation signal are simultaneously output to the CPU 30. The reason that this configuration is adopted is as follows. That is, for example, upon performing excavation operation, if the wheel excavator body moves against the braking force of the work braking device due to the load of the excavation operation, there is the possibility that when the park braking device is in operation, excessive load could be imposed on the park braking device (that is, the transmission 8).

According to the present embodiment, the CPU 30 executes the following processing.

(1) As mentioned above, the configuration is adopted in which when the park brake switch 32 is turned on, the work brake switch 35 is turned off and when the work brake switch 35 is turned on, the park brake switch 32 is turned off. Therefore, when the park brake switch 32 is turned on, the park brake switch 32 outputs a park brake operation signal to the CPU 30 and the work brake switch 35 outputs a work brake release signal to the CPU 30. As a result, the CPU 30 outputs a control signal to the electromagnetic valve 13 to cause it to be changed over to the position C and a control signal to the electromagnetic valve 27 to cause it to be changed to the position B. Therefore, the transmission

8 is locked to prevent the rotation of the axle shaft 9 so that the park braking device is brought into operation, and the work braking device is released.

(2) When the work brake switch 35 is turned on, the work brake switch 35 outputs a work brake operation signal to the CPU 30 while the park brake switch 32 outputs a park brake release signal to the CPU 30. As a result, the CPU 30 outputs a control signal to the electromagnetic valve 27 to cause it to be changed to the position A and also outputs a control signal to the electromagnetic changeover valve 13 to cause it to be changed to a position other than the position C and corresponding to the selected position of the gear shift switch 33. Therefore, the work braking deice is brought into operation and at the same time the park brake is released, so that the gear of the transmission 8 is changed over to the first gear or the second gear corresponding to the selected position of the gear shift switch 33.

(3) When both the park brake switch 32 and the work brake switch 35 are turned off, the park brake switch 32 outputs a park brake release signal to the CPU 30 and the work brake switch 35 outputs a work brake release signal to the CPU 30. As a result, the park brake is released and the gear of the transmission 8 is changed over to the first or second gear corresponding to the selected position of the gear shift switch 33 and also the work braking device is released.

(4) When the park brake switch 32 is off, the park brake switch 32 outputs a park brake release signal to the CPU 30 as mentioned above, the park braking device is released, so that the gear of the transmission 8 is changed over to the first or second gear corresponding to the selected position of the gear shift switch 33 and also the work braking device is released. That is, when the gear shift switch 33 is selected to be at the first gear, the gear shift switch 33 outputs a speed change signal for shifting to the first gear to the CPU 30. As a result, the CPU 30 outputs a control signal to the electromagnetic changeover valve 13 to cause it to be changed over to the position A. Therefore, the electromagnetic changeover valve 13 is changed over to the position A and the gear of the transmission 8 is changed over to the first gear. When the gear shift switch 33 is selected to be at the second gear, the gear shift switch 33 outputs a speed change signal for shifting to the second gear to the CPU 30. As a result, the CPU 30 outputs a control signal to the electromagnetic changeover valve 13 to cause it to be changed to the position B. Therefore, the electromagnetic changeover valve 13 is changed over to the position B, so that the gear of the transmission 8 is changed over to the second gear.

(5) When the gate lock lever 41 is set at the release position, the gate lock switch 36 outputs a release signal to the CPU 30. As a result, the CPU 30 outputs a control signal to the gate lock changeover valve 44 to cause it to be changed to the position A. Therefore, the gate lock changeover valve 44 is changed over to the position A, so that the pressure oil from the hydraulic pressure source 12 is supplied to the pilot valves 43. Accordingly, by operating the operating lever 42, the corresponding swiveling device 82 or each part of the front attachment 84 can be driven. That is, a state in which it is possible to drive the work device (work actuator) (work device drivable state) is established.

(6) When the gate lock lever 41 has been operated to the lock position, the gate lock switch 36 outputs a lock signal to the CPU 30. As a result, the CPU 30 outputs a control signal to the gate lock changeover valve 44 to cause it to be changed over to the position B. Therefore, the gate lock changeover valve 44 is changed over to the position B and supply of the pilot pressure oil from the hydraulic pressure source 12 to the pilot valves 43 is blocked. Therefore, even when the operating lever 42 is operated, the swiveling device 82 and each part of the work front attachment 84 cannot be driven. That is, the work device drivable state is lost.

—Operation of the Park Brake while the Work Brake is in Operation—

As mentioned above, according to the present embodiment, the park brake switch 32 and the work brake switch 35 are configured so that they are not turned on simultaneously in order to protect the park braking device (that is, the transmission 8). However, when it is apparent that a work by the wheel excavator, such as excavation operation, is not performed, no work load is imposed on the body of the wheel excavator, so that there will be no problem if the park brake is operated while the work braking device is in operation. For example, when the operator gets out of the operator's cab 85 with the work braking device being operated in order to perform inspection of the wheel excavator and gets off the vehicle, it is apparent that no work is done by the wheel excavator, so that there will be no problem if the park braking device is operated while the work braking device is in operation. That is, since the work device is not in a drivable or operable state, there will be no problem if the park braking device is operated while the work braking device is in operation.

Assuming that the wheel excavator is stopped by operating the work braking device without operating the park braking device on an irregular ground or slope ground and the operator gets off the vehicle, then if the work braking device should be released due to, for example, failure of the electric system, there would be the possibility that the wheel excavator could move. Hence, according to the present embodiment, a configuration is adopted in which even when the work braking device is in operation and even when the park brake switch 32 is off, the park braking device is operated in case it is apparent that no work is to be done by the wheel excavator.

In case, for example, that the gate lock lever 41 has been operated to the lock position, even if the operating lever 42 is operated as mentioned above, the swiveling device 82 and each part of the work front attachment 84 cannot be driven, so that it is apparent that no work is done by the wheeled shovel. Then, according to the present embodiment, a configuration is adopted in which in case that the work brake switch 35 is on (that is, in case that the park brake switch 32 is off) and the gate lock lever 41 is operated to the lock position, the park braking device is activated while the work braking device is in operation.

Specifically, when the CPU 30 receives a park brake release signal from the park brake switch 32, a work brake operation signal from the work brake switch 35, and a lock signal from the gate lock switch 36, the CPU 30 outputs the following control signals. That is, the CPU 30 outputs a control signal to the electromagnetic valve 27 to cause it to be changed over to the position A, a control signal to the gate lock changeover valve 44 to cause it to be changed over to the position B, and a control signal to the electromagnetic changeover valve 13 to cause it to be changed over to the position C. With this configuration, the work braking device is brought in operation and even if the operating lever 42 is operated, not only the swiveling device 82 and each part of the work front attachment 84 cannot be driven, but also the park braking device is brought into operation.

According to this configuration, when the gate lock lever 41 is operated in this state to the release position, the park braking device is released. Specifically, when the CPU 30 receives a park brake release signal from the park brake switch 32, a work brake operation signal from the work brake switch 35, and a release signal from the gate lock switch 36, the CPU 30 outputs the following control signals. That is, the CPU 30 outputs a control signal to the electromagnetic valve 27 to cause it to be changed over to the position A, a control signal to the gate lock changeover valve 44 to cause it to be changed over to the position A, and a control signal to the electromagnetic valve 13 to cause it to be changed over to a position other than the position C, which is according to the selected position of the gear shift switch 33. With this configuration, the work braking device is operated and the swiveling device 82 and each part of the work front attachment 84 can be driven according to the operation by the operating lever 42 and the park braking device is released.

Figure 3:
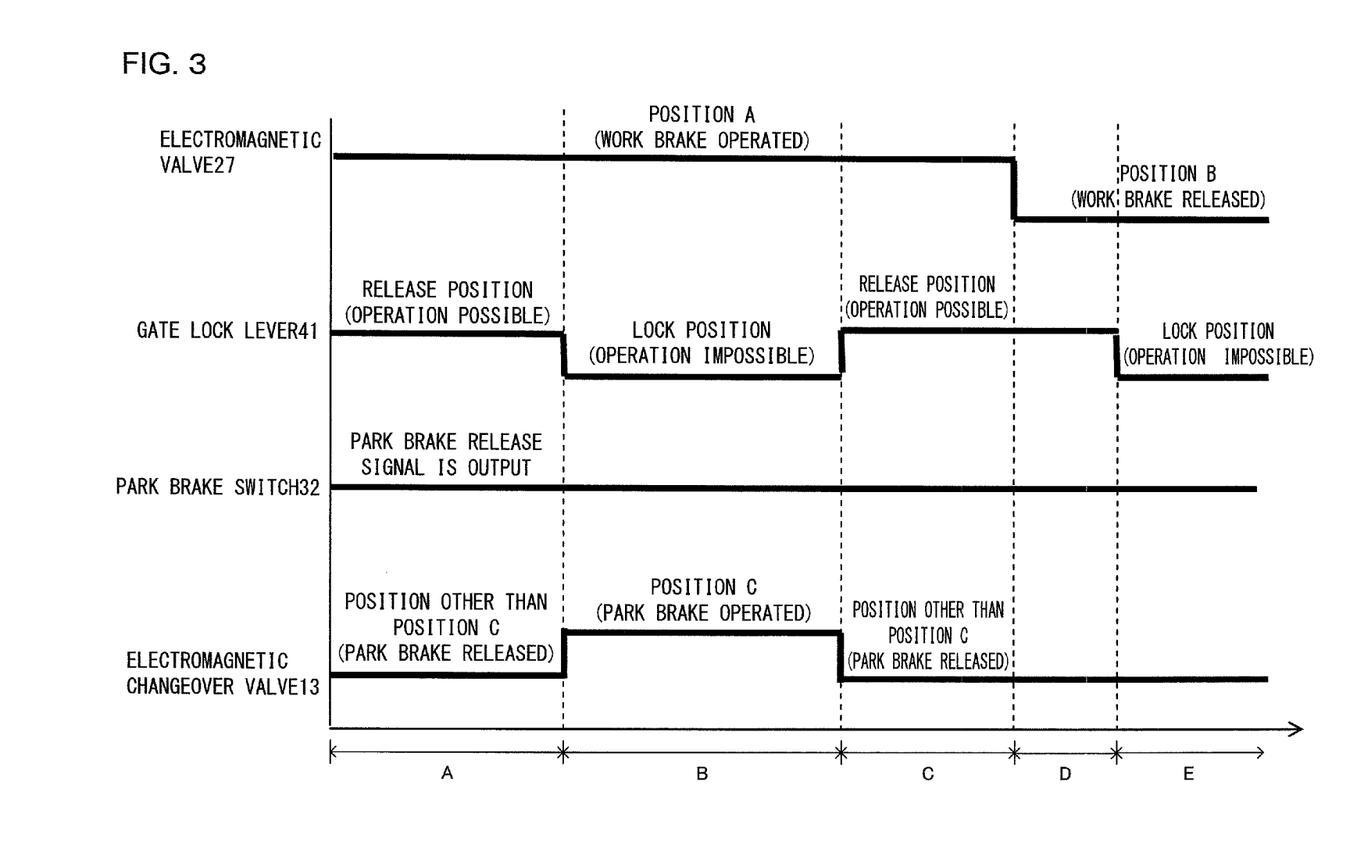
FIG. 3 presents a time-chart diagram illustrating operation of a park braking device while the work braking device is in operation.

FIG. 3 presents a time chart illustrating the operation of the park braking device while the work braking device is in operation. In the following explanation, periods indicated by symbols A, B, C, D, and E are termed periods A, B, C, D, and E, respectively. As shown in FIG. 3, in the period A, the electromagnetic valve 27 is changed over to the position A and the work braking device is in operation (that is, the work brake switch 35 is on), and the gate lock lever 41 has been operated to the release position. In this case, as mentioned above, the park braking switch 32 is turned off, so that a park brake release signal is output from the park brake switch 32. Since the electromagnetic changeover valve 13 is changed over to a position other than the position C and according to the selection position of the gear shift switch 33, the park braking device is released.

Here, if the gate lock lever 41 is operated to the lock position (period B in FIG. 3), as mentioned above, the electromagnetic changeover valve 13 is changed over to the position C, so that the park braking device is brought into operation. Then, since the electromagnetic valve 27 has been changed over to the position A, the work braking device is also in operation. Note that since the park brake switch 32 is off, a park brake release signal is output from the park brake switch 32.

Thereafter, when the gate lock lever 41 is operated to the release position again (period C in FIG. 3), as mentioned above, the electromagnetic changeover valve 13 is changed over to a position other than the position C and according to the selection position of the gear shift switch 33, and the park braking device is released. Then, since the electromagnetic valve 27 is changed over to the position A, the work braking device is in operation. Note that since the park brake switch 32 is off, a park brake release signal is output from the park brake switch 32.

Thereafter, as in period D in FIG. 3, even when the electromagnetic valve 27 is changed over to the position B to release the work braking device (that is, the work brake switch 35 is turned off), the park braking device remains to be released since the park brake switch 32 is not on. Furthermore, in this state, if the gate lock lever 41 is operated to the lock position (period E in FIG. 3), since the park brake switch 32 is not on, the park braking device remains to be released.

Figure 4:
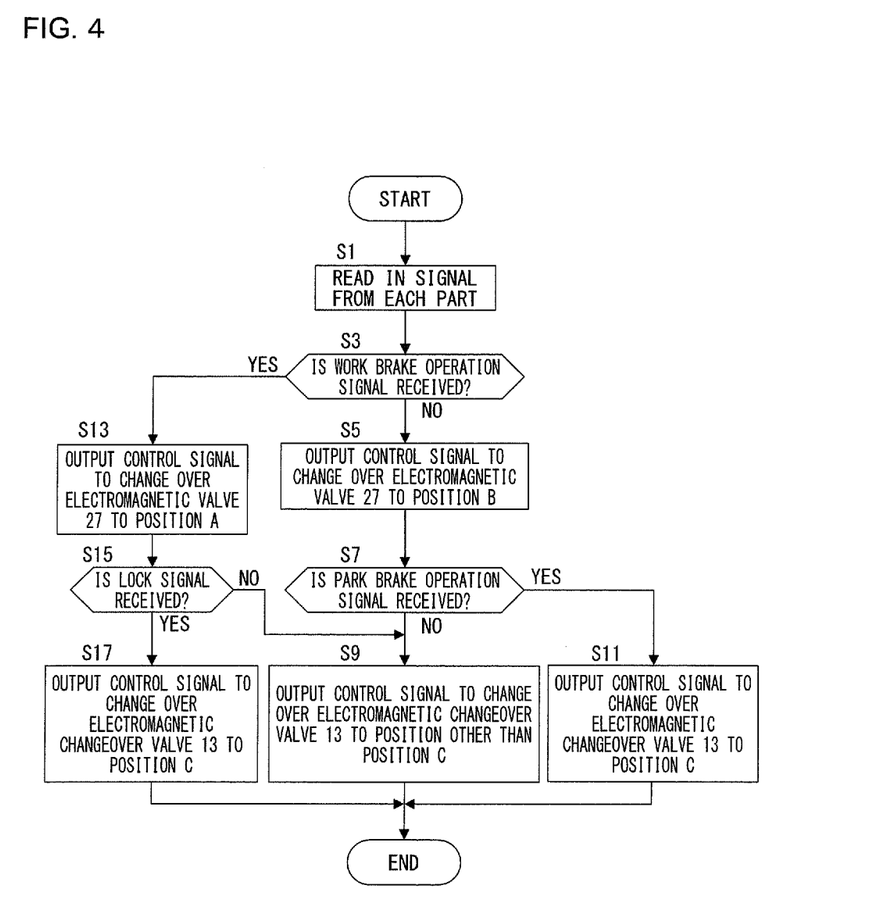
FIG. 4 presents a flowchart illustrating operation of a control process of the park braking device.

FIG. 4 presents a flowchart illustrating the operation of the control processing of the above mentioned park brake. When an ignition switch (not shown) of the wheel excavator is turned on, a program for performing the processing shown in FIG. 4 is started up and repeatedly executed in the CPU 30. In step S1, an output signal from each part that is connected to the CPU 30 is read in and the control proceeds to step S3. In step S3, based on the output signal from each part and read in step S1, it is judged whether or not a work brake operation signal has been received.

If a negative judgment is made in step S3, the control proceeds to step S5 in which a control signal is output to the electromagnetic valve 27 to cause it to be changed over to the position B. Then, the control proceeds to step S7. In step S7, based on the output signals read in from the respective parts in step S1, it is judged whether or not a park brake operation signal has been received. If a negative judgment is made in step S7, the control proceeds to step S9, in which a control signal is output to the electromagnetic changeover valve 13 to cause it to be changed over to a position other than the position C and according to the selected position of the gear shift switch 33 and then the program is terminated.

If an affirmative judgment is made in step S7, the control proceeds to step S11, in which a control signal is output to the electromagnetic valve 13 to cause it to be changed over to the position C and then the program is terminated.

If an affirmative judgment is made in step S3, the control proceeds to step S13, in which a control signal is output to the electromagnetic valve 27 to cause it to be changed over to the position A and then the control proceeds to step S15. In step S15, it is judged as to whether or not a lock signal is received from the gate lock switch 36 based on the signals read in from the respective parts in step S1. If an affirmative judgment is made in step S15, the control proceeds to step S17, in which a control signal is output to the electromagnetic changeover valve 13 to cause it to be changed over to the position C and then the program is terminated. If a negative judgment is made in step S15, the control proceeds to step S9.

Note that the above-mentioned program prescribes no relationship between a signal output from the gate lock switch 36 and the operation of the gate lock changeover switch 44. However, as mentioned above, the CPU 30 outputs a control signal to the gate lock changeover valve 44 to cause it to be changed over to the position A upon receipt of a release signal independently of the above-mentioned program. As mentioned above, the CPU 30 outputs a control signal to the gate lock changeover valve 44 to cause it to be changed over to the position B upon receipt of a lock signal independently of the above-mentioned program.

The wheel excavator according to the above-mentioned embodiment exhibits the following advantageous effects.

(1) A configuration is adopted in which when the work brake switch 35 is on (that is, when the park brake switch 32 is off) and the gate lock lever 41 has been operated to the lock position, the park braking device is brought into operation while the work braking device is in operation. With this configuration, assuming that the wheel excavator is stopped only with the work braking device on an irregular ground or slope ground and the operator gets out of the vehicle, even if the work braking device should be released due to, for example, failure of the electric system, the wheel excavator would not move. Therefore, the wheel excavator can be stopped without fail, so that safety can be increased.

(2) When the work brake switch 35 is turned on and the gate lock lever 41 is operated to the lock position, the park braking device is operated while the work braking device is in operation as described above. A configuration is adopted, in which thereafter, when the gate lock lever 41 is operated to the release position, the park braking device is released. With this configuration, when the work by the wheel excavator is started and some work load may be imposed on the wheel excavator, the park braking device is released so that durability of the park braking device can be increased without the possibility of damaging the park braking device due to the work load.

(3) A configuration is adopted, in which it is judged as to whether or not the park braking device is to be operated concurrently while the work braking device is in operation, that is, whether or not excessive load will be imposed on the park braking device in case the park braking device is operated while the work braking device is in operation, in other words, whether or not it is possible to drive the work device, according to the operation position of the gate lock lever 41. With this configuration, by using the conventional gate lock lever 41 and the gate lock switch 36, it is possible to judge whether or not the work braking device and the park braking device can be operated simultaneously, so that an increase in cost can be prevented.

Variation Example (1) In the embodiment explained above, a configuration is adopted, in which when the work brake switch 35 is turned on, the work braking device is operated. However, the present invention is not limited thereto. It may be configured, for example, such that when the work brake switch 35 is turned on and the vehicle speed is at a predetermined speed (for example, 5 km/hour) or lower, and if the brake pedal 22 is depressed in a predetermined depression amount or more (with a predetermined depression force or more), the work braking device is operated. Then, if the gate lock lever 41 is operated to the lock position while the work braking device is in operation, further the park braking device is operated. Note that the vehicle speed is detected with the vehicle speed sensor 34 and the depression amount (depression force) of the brake pedal 22 is detected with the pressure sensor 31.

Figure 5:
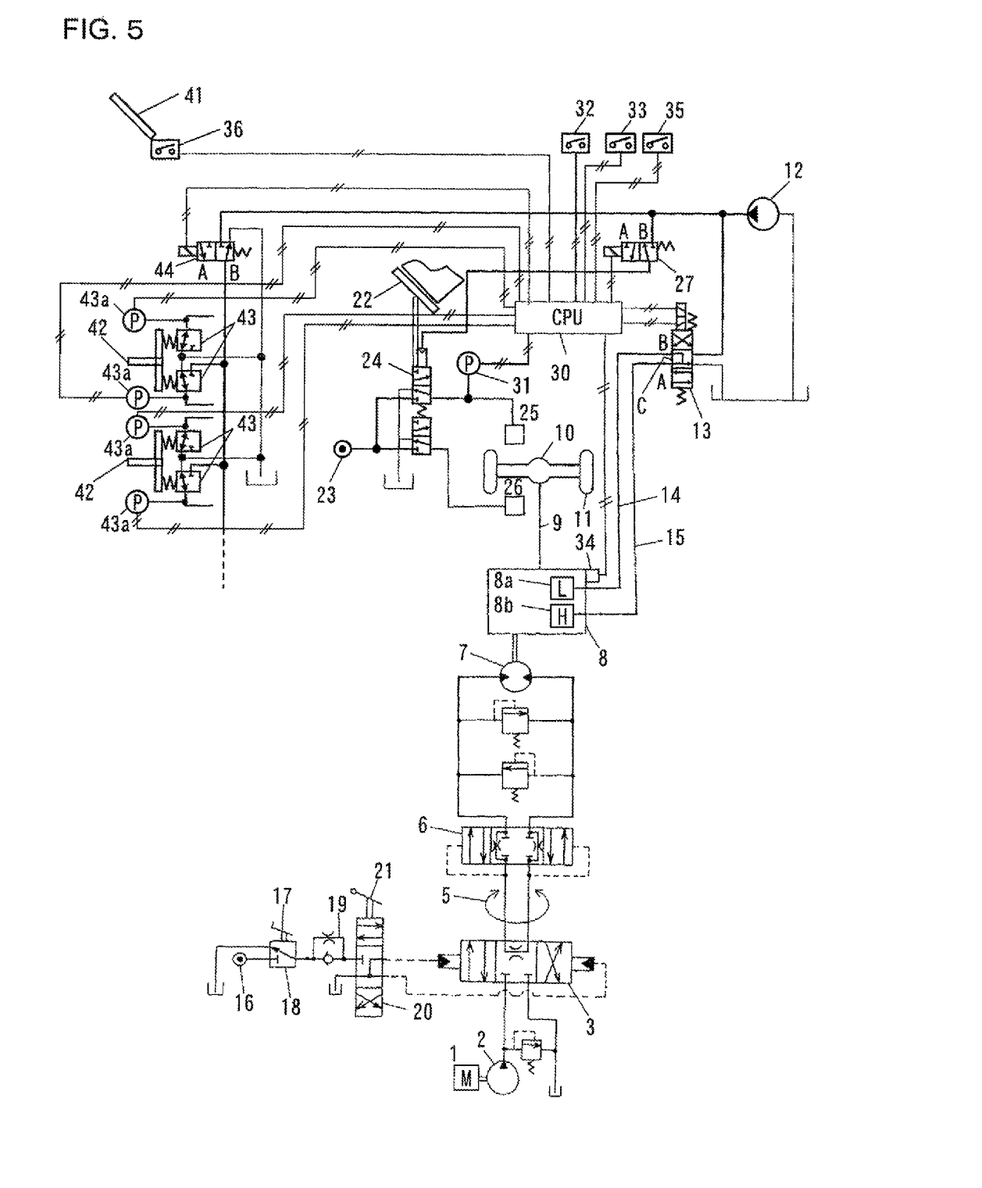
FIG. 5 presents a diagram showing a variation example.

(2) According to the configuration explained above, it is judged as to whether or not the work device is in a state in which it can be driven based on the operation position of the gate lock lever 41. However, the present invention is not limited thereto. For example, a configuration may be adopted, in which whether or not the operating lever 42 has been operated is detected by detecting the pressure of the pilot pressure oil, which is controlled with the pilot valve 43, based on detection by a pressure sensor 43a shown in FIG. 5. And it may be configured such that when it is judged that the operating lever 42 has been operated based on the pressure detected by the pressure sensor 43a, the CPU 30 judges that the work device is in a state in which it can be driven whereas when it is judged that the operating lever has not been operated, the CPU 30 judges that the work device is in a state in which it cannot be driven.

Figure 6:
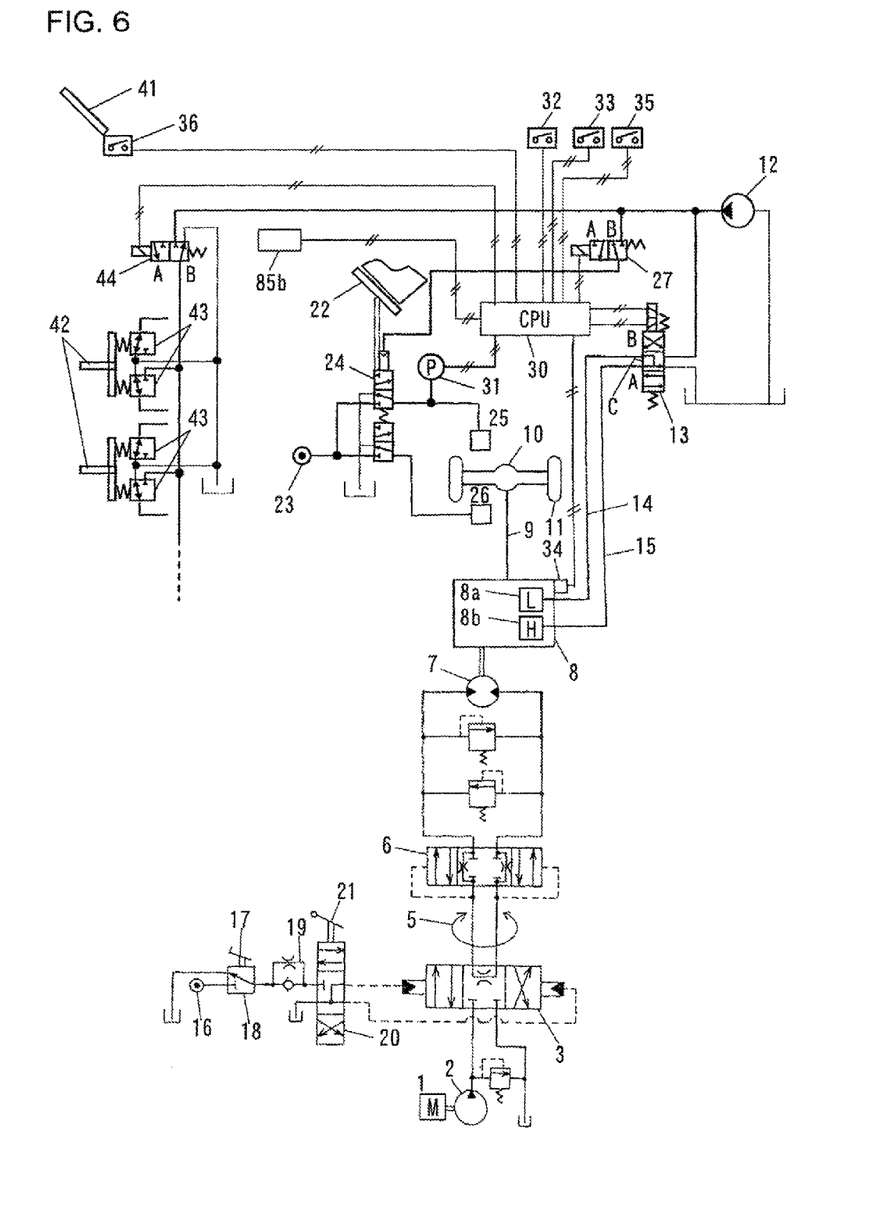
FIG. 6 presents a diagram showing a variation example.

Furthermore, it may be configured, for example, such that whether or not the operator is seated may be detected by a seating sensor 85b provided at the operator's seat 85a as shown in FIG. 6. It may be configured such that if it is judged that the operator is seated in the operator's seat 85a based on an output signal from the seating sensor 85b, the CPU 30 judges that the work device is in a state in which it can be driven whereas if it is judged that the operator is not seated in the operator's seat 85a based on the output signal from the seating sensor 85b, the CPU 30 judges that the work device is not in a state in which it can be driven.

(3) In the above explanation, explanation is made taking a wheeled hydraulic excavator (wheel excavator) as an example of the work machine. However, the present invention is not limited thereto. For example, the present invention may be applied to hydraulic control devices of various work machines that are provided with tires and travel on the site of work and open roads.

(4) The above-mentioned embodiments and variation examples may be combined with each other in any combinations.

Note that the present invention is not limited to the above-mentioned embodiments but includes a hydraulic control device for various types and structures of work machines. That is, the hydraulic control device for a work machine according to the present invention is characterized by including a driving device that generates a driving force for traveling of the work machine; a park braking device that parks the work machine; an operating unit that is provided in a cab of the work machine and operated by an operator for driving a work device; a hydraulic brake device that generates a braking force according to operation of a brake pedal; a hydraulic lock unit that hydraulically locks the hydraulic brake device to cause the hydraulic brake device to be continuously operated; a work machine drivable state judging unit that judges whether or not the work device is in a work device drivable state in which the work device can be driven; and a park brake control unit that brings the park braking device into operation when the hydraulic lock unit hydraulically locks the hydraulic brake device and the work device drivable state judging unit judges that the work device drivable state has not been established.

The disclosure of the following priority application is herein incorporated by reference: Japanese Patent Application No. 2012-009249 (filed on Jan. 19, 2012).

The invention claimed is:

1. A hydraulic control device for work machine, comprising:
    a driving device that generates a driving force for traveling of the work machine;
    a park braking device that parks the work machine;
    an operating unit that is provided in a cab of the work machine and operated by an operator for driving a work device;
    a hydraulic brake device that generates a braking force according to operation of a brake pedal;
    a hydraulic lock unit that hydraulically locks the hydraulic brake device to cause the hydraulic brake device to be continuously operated;
    a work device drivable state judging unit that judges whether or not the work device is in a work device drivable state in which the work device can be driven;
    a park brake control unit that brings the park braking device into operation when the hydraulic lock unit hydraulically locks the hydraulic brake device and the work device drivable state judging unit judges that the work device drivable state has not been established; and
    an operation detection unit that detects whether or not the operating unit is operated, wherein:
        the work device drivable state judging unit judges that the work device drivable state is not established when the operation detection unit detects that the operating unit has not been operated.

2. A hydraulic control device for work machine according to claim 1, further comprising:
    a gate lock unit that changes over whether or not the work device can be operated by the operating unit; and
    a gate lock changeover state detection unit that detects a changeover state of the gate lock unit, wherein:
        the work device drivable state judging unit judges that the work device drivable state has not been established when the gate lock changeover state detection unit detects that the gate lock unit prohibits operation of the work device by the operating unit.

3. A hydraulic control device for work machine according to claim 2, wherein:
    the park braking device comprises a transmission that has first and second clutch devices of negative type; and
    the transmission prevents rotation of an axle shaft when the first and second clutch devices are engaged simultaneously, sets a first transmission gear ratio to allow rotation of the axle shaft when the first clutch device is released, and sets a second transmission gear ratio, which is greater than the first transmission gear ratio, to allow the rotation of the axle shaft when the second clutch device is released.

4. A hydraulic control device for work machine according to claim 1, further comprising:
a seating detection unit that detects whether or not the operator is seated in an operator's seat of the work machine, wherein:
the work device drivable state judging unit judges that the work device drivable state is not established when the seating detection unit detects that the operator is not seated in the operator's seat.

5. A hydraulic control device for work machine according to claim 4, wherein:
the park braking device comprises a transmission that has first and second clutch devices of negative type; and
the transmission prevents rotation of an axle shaft when the first and second clutch devices are engaged simultaneously, sets a first transmission gear ratio to allow rotation of the axle shaft when the first clutch device is released, and sets a second transmission gear ratio, which is greater than the first transmission gear ratio, to allow the rotation of the axle shaft when the second clutch device is released.

6. A hydraulic control device for work machine according to claim 1, wherein:
the park braking device comprises a transmission that has first and second clutch devices of negative type; and
the transmission prevents rotation of an axle shaft when the first and second clutch devices are engaged simultaneously, sets a first transmission gear ratio to allow rotation of the axle shaft when the first clutch device is released, and sets a second transmission gear ratio, which is greater than the first transmission gear ratio, to allow the rotation of the axle shaft when the second clutch device is released.

* * * * *